United States Patent [19]

Wawrzyniak

[11] Patent Number: 5,393,174
[45] Date of Patent: Feb. 28, 1995

[54] SAW MILL APPARATUS FOR CASTINGS AND METHOD

[76] Inventor: Walter W. Wawrzyniak, 34452 Jefferson, #C-39, Mt. Clemens, Mich. 48045

[21] Appl. No.: 139,190

[22] Filed: Oct. 19, 1993

Related U.S. Application Data

[62] Division of Ser. No. 733,890, Jul. 22, 1991, Pat. No. 5,284,407.

[51] Int. Cl.$^6$ .............................................. B26D 1/12
[52] U.S. Cl. ......................................... 407/51; 407/58
[58] Field of Search ........................ 407/51, 52, 56, 58, 407/61, 33, 47

[56] References Cited

U.S. PATENT DOCUMENTS

| | | | |
|---|---|---|---|
| 1,125,537 | 1/1915 | Hoover | 409/229 X |
| 2,082,310 | 6/1937 | Turnepseed | 409/163 |
| 3,674,065 | 7/1972 | Fairfield, Jr. et al. | 83/13 |
| 3,701,187 | 10/1972 | Erkfritz | 407/51 X |
| 3,729,808 | 5/1973 | Wolf et al. | 407/51 X |
| 3,899,813 | 8/1975 | Lovendahl | 407/51 X |
| 3,952,630 | 4/1976 | Fencl et al. | 409/140 X |
| 4,848,200 | 7/1989 | McGehee | 83/169 |
| 4,932,813 | 6/1990 | Qvart | 407/51 X |
| 5,090,845 | 2/1992 | Bentjens | 407/52 |

OTHER PUBLICATIONS

The cover, title page and page 278 of the catalog titled "Coromant Metal Working Products" with a copyright date of 1986 and depicting the T-Max Slitting Cutter A331.31.
The back page, and pages 31 and 33 of the Hytec catalog with a copyright date of 1991 and depicting support pads as referenced at page 8 of the specification.

*Primary Examiner*—Z. R. Bilinsky
*Attorney, Agent, or Firm*—Harness, Dickey & Pierce

[57] ABSTRACT

Apparatus including a saw mill cutter for removing risers or excess material from castings such as for engine blocks, cylinder heads, cam carriers, transmission housings and the like, with the saw mill cutter simultaneously cutting the riser from the casting body while milling the cut surface to form a finished and/or semi finished surface and with a method for utilizing such a saw mill cutter and forming such finished and/or semi-finished surface and with one form of the method including feeding the casting widthwise to the cutter such that it is cut and milled along its length.

10 Claims, 7 Drawing Sheets

SAW MILL APPARATUS FOR CASTINGS AND METHOD

This is a division of U.S. Pat. application Ser. No. 07/733,890, filed Jul. 22, 1991, now U.S. Pat. No. 5,284,407.

SUMMARY BACKGROUND OF THE INVENTION

The present invention relates to apparatus for simultaneously, sawing and milling workpieces from relatively large castings and to a method for simultaneously sawing and milling such castings.

Relatively large workpieces such as engine blocks, cylinder heads, cam carriers, transmission housings and the like are routinely manufactured from castings, i.e. aluminum, cast iron, or other suitable materials. Frequently risers or excess materials are formed in the casting process which must be removed by sawing or cutting before a final, finished surface can be machined on the cut surface. The finished surface is frequently adapted to be secured to another member in sealing engagement and hence the surface must be accurately formed with a fine, final finish. It has been the practice to machine such castings by a series of steps. First a rough saw cut is made to remove most of the excess material formed by the riser of cast material or the like. Next a semi-finished surface is formed by milling the rough saw cut surface. A final, finished surface is then formed by milling the semi-finished surface. It can be seen that this requires a number of separate machining steps and often also requires transfer steps from a sawing or cutting station to the milling station. In the present invention a unique apparatus and method are provided by which a finished machined surface can be provided with a single cut. In this regard a unique saw mill and related apparatus is utilized such that the excess riser material is removed and a finished machined surface provided in a single operation.

Thus it is an object of the present invention to provide a unique apparatus for providing a finished surface on a cast workpiece in a single operation.

It is another object of the present invention to provide a unique method for machining a finished surface on a cast workpiece in a single operation.

Other objects, features, and advantages of the present invention will become apparent from the subsequent description and the appended claims, taken in conjunction with the accompanying drawings, in which:

Figure 1:
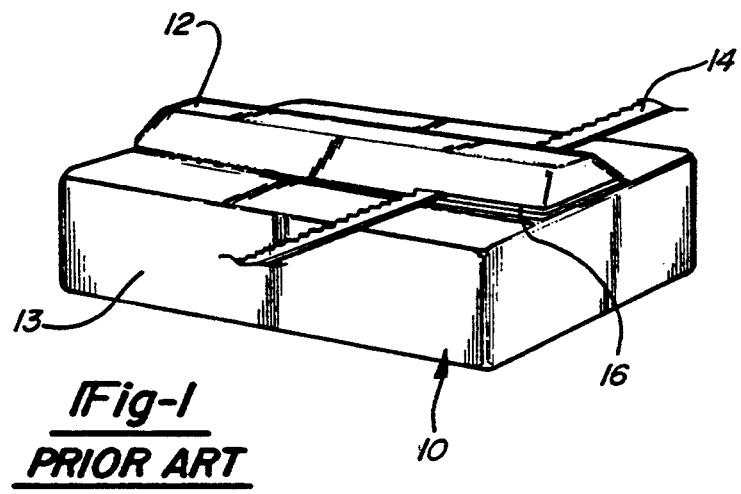
FIG. 1 is a partial side elevational view depicting a prior art sawing step for removing the riser from a cast workpiece.
Figure 2:
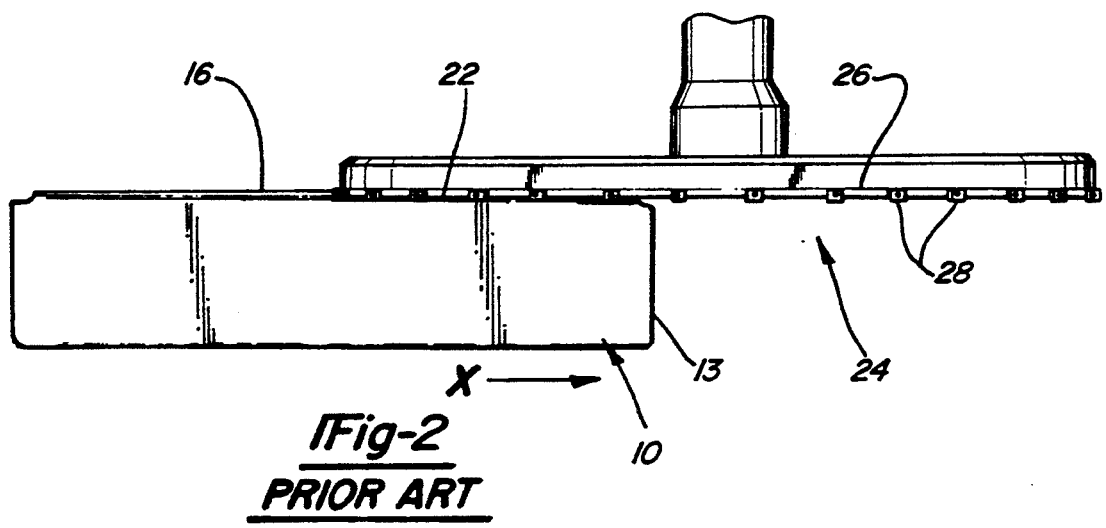
FIG. 2 is a view of the workpiece of FIG. 1 having a semi-finished and/or finished surface milled or machined on the surface previously sawed.

Looking now to FIGS. 1 and 2, prior art apparatus is shown for sawing and finish machining a casting surface. Thus in FIG. 1, a cylinder head casting 10 is shown in cast form and has a casting riser 12 formed on the cast cylinder head housing 13 during the casting process. A band saw 14 is utilized to rough cut the riser 12 from the cylinder head housing 13 leaving a rough cut surface 16. The saw 14 and related cutting apparatus is of a construction well known in the art and hence the details have been omitted for purposes of simplicity.

After the rough saw cut has been made as shown in FIG. 1, the casting 10 is moved to a milling station, see FIG. 2, where a final, machined surface 22 is formed. This is frequently done in two steps; in a first milling operation a semi-finished surface is formed. The final finished surface is formed in a second milling operation which can be performed at the same station or at a separate milling station. The milling station of FIG. 2 depicts a single station operation at which, a milling cutter 24 is provided which removes the rough cut surface 16 and forms the final machined surface 22 in two passes. The milling cutter 24 has a circular body 26 with a plurality of removable and hence replaceable milling inserts 28 located circumferentially around the periphery of the body 26. The cutting inserts 28 are located about the cutter periphery of body 26 in a manner to perform a cutting or milling operation only in one plane, i.e. along the rough cut surface 16. The above milling apparatus is of a construction well known in the art and hence the details have been omitted for purposes of simplicity. Note, as with the sawing step of FIG. 1, the cast housing 13 is being milled widthwise moving in the direction of its length or long dimension in the direction of the arrow X in FIG. 2. Thus the diameter of the milling body 26 need be only large enough to accept the shorter, width dimension of the cast housing 13. Note, however, that the time required for moving the casting 10 along the length in both the sawing and milling steps will be influenced by the length of the casting 10 and cast housing 13. In this regard the length of cut of casting 10 along its length will be generally around three times the length of cut along its width. As noted the castings are routinely quite large and,for example, can have lengths of around twenty inches and widths of around seven inches.

Figure 3:
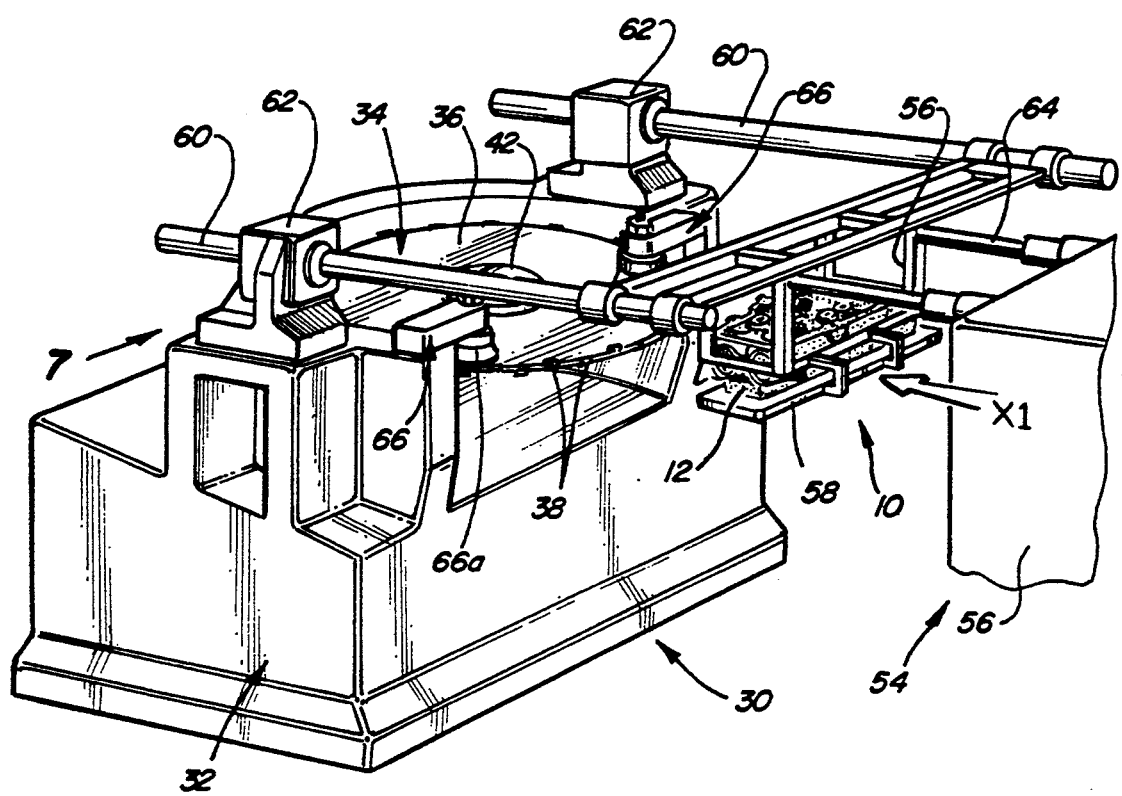
FIG. 3 is a pictorial view of the apparatus of the present invention shown prior to the initiation of mill cutting a riser from a cast workpiece.

In the form of the present invention shown in FIGS. 3-7, the relatively large casting is cut and milled lengthwise and hence moved along its width relative to a unique saw mill cutter in the direction of arrow X1 in FIG. 3. At the same time the saw mill cutter is of a large diameter to accommodate the large sized castings. In order to assure that accuracy is maintained during the sawing-milling step, the large diameter saw mill cutter is axially supported at a number of positions to inhibit flexing and provide stability.

Looking now to the drawings a combination saw mill assembly 30 is shown for removing the casting riser 12 from the casting 10. The saw mill assembly 30 includes a support housing 32 for supporting and rotating a combination saw mill cutter 34. The saw mill cutter 34 includes a circular body 36 and a plurality of removable and hence replaceable milling cutter inserts 38 located circumferentially around the periphery of the saw mill body 36 (see FIG. 8). The unique saw mill cutter 34 including the body 36 and milling cutter inserts 38 can be generally of a construction similar to that of a slot milling cutter. Such a slot milling cutter can be generally of a type manufactured and sold by SANDVIK and referenced as a T-MAX SLITTING CUTTER A331.31; see catalog titled Coromat Metal Working Products, dated 1986.

Figure 4:
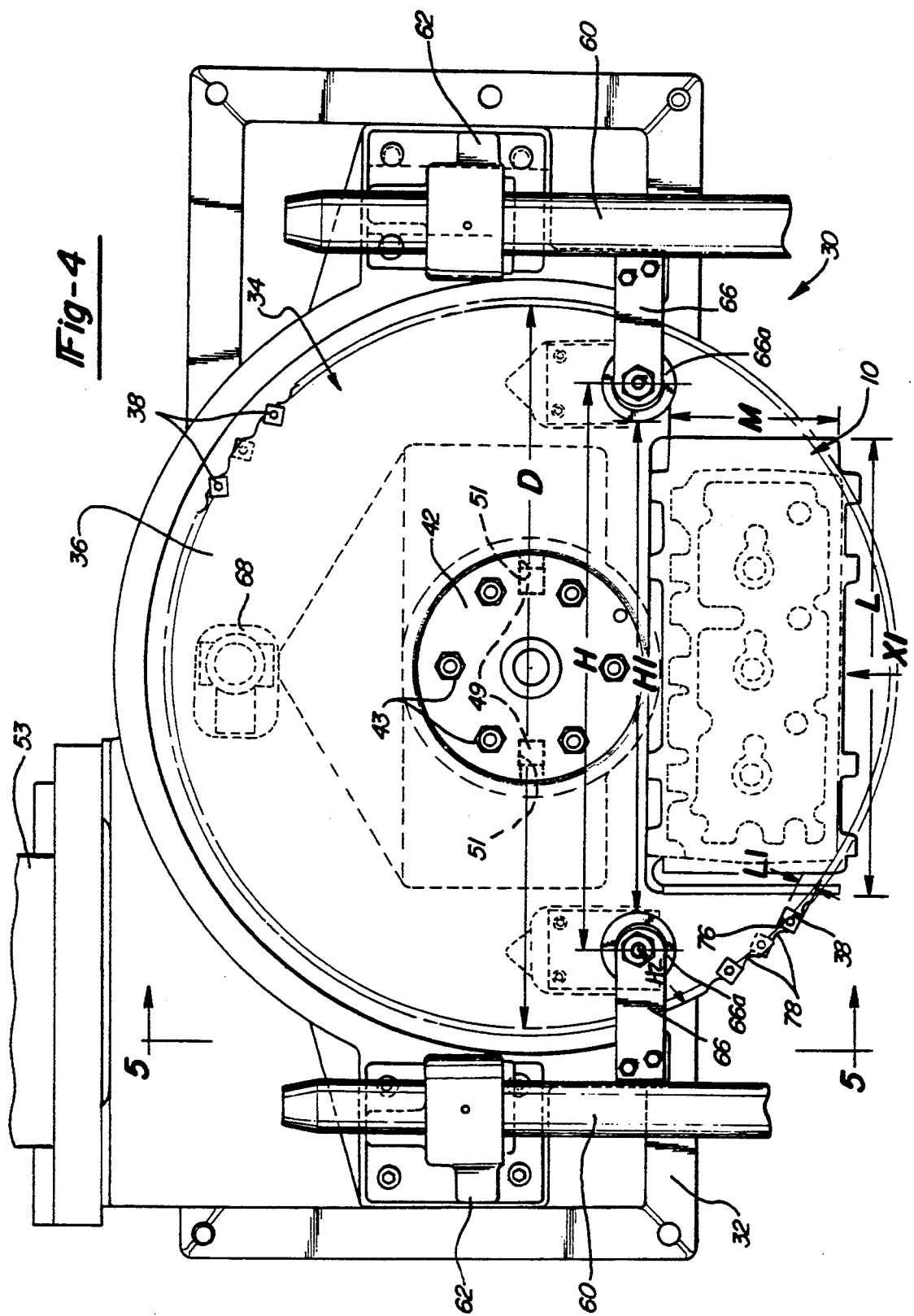
FIG. 4 is a fragmentary top elevational view to enlarged scale of the apparatus of FIG. 3 showing the cast workpiece during the mill cutting step.
Figure 5:
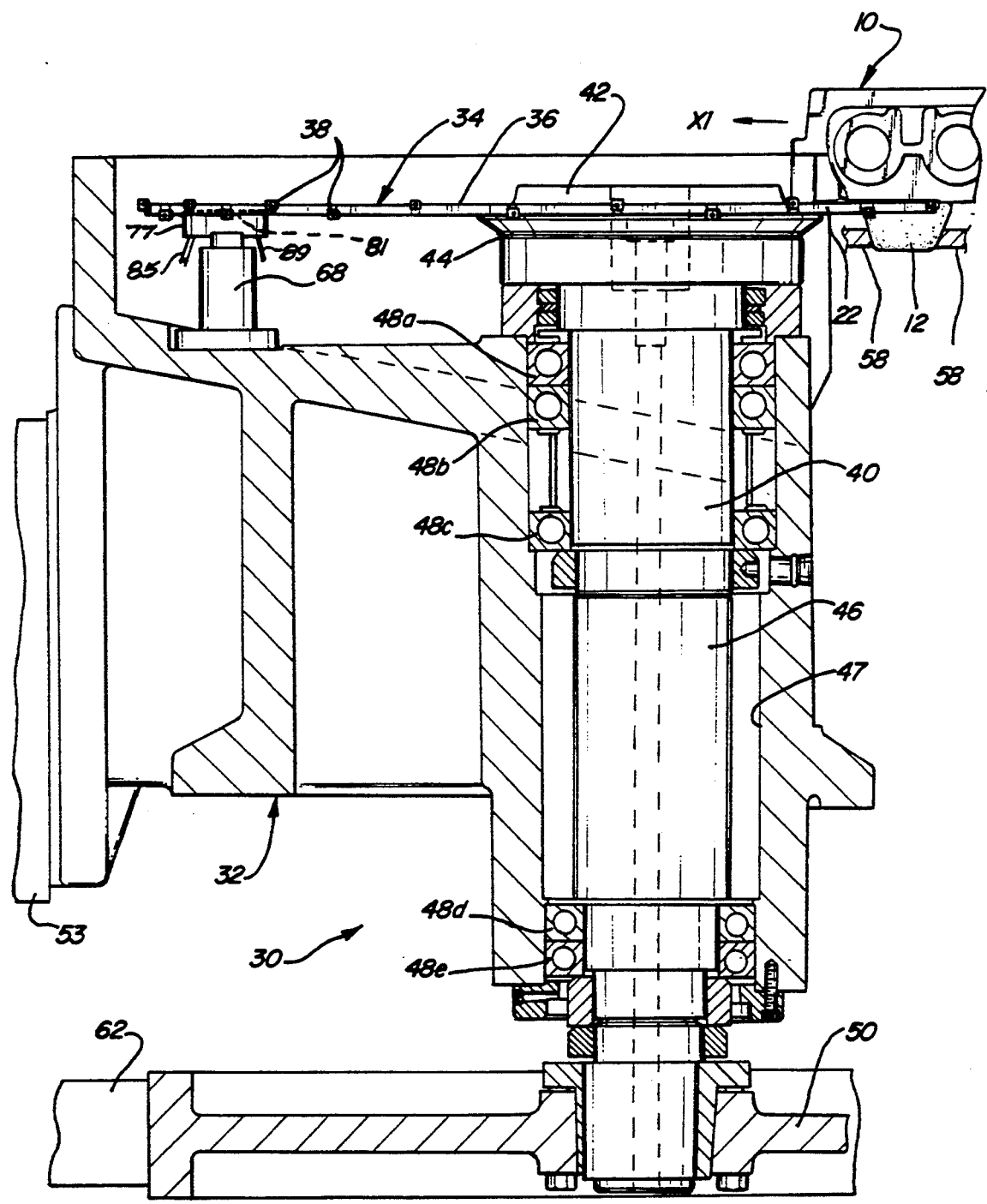
FIG. 5 is a fragmentary view with some parts broken away and others in section generally taken in the direction of the arrows 5—5 in FIG. 4 of the apparatus of FIGS. 3 and 4 showing the cast workpiece during the mill cutting step.
Figure 6:
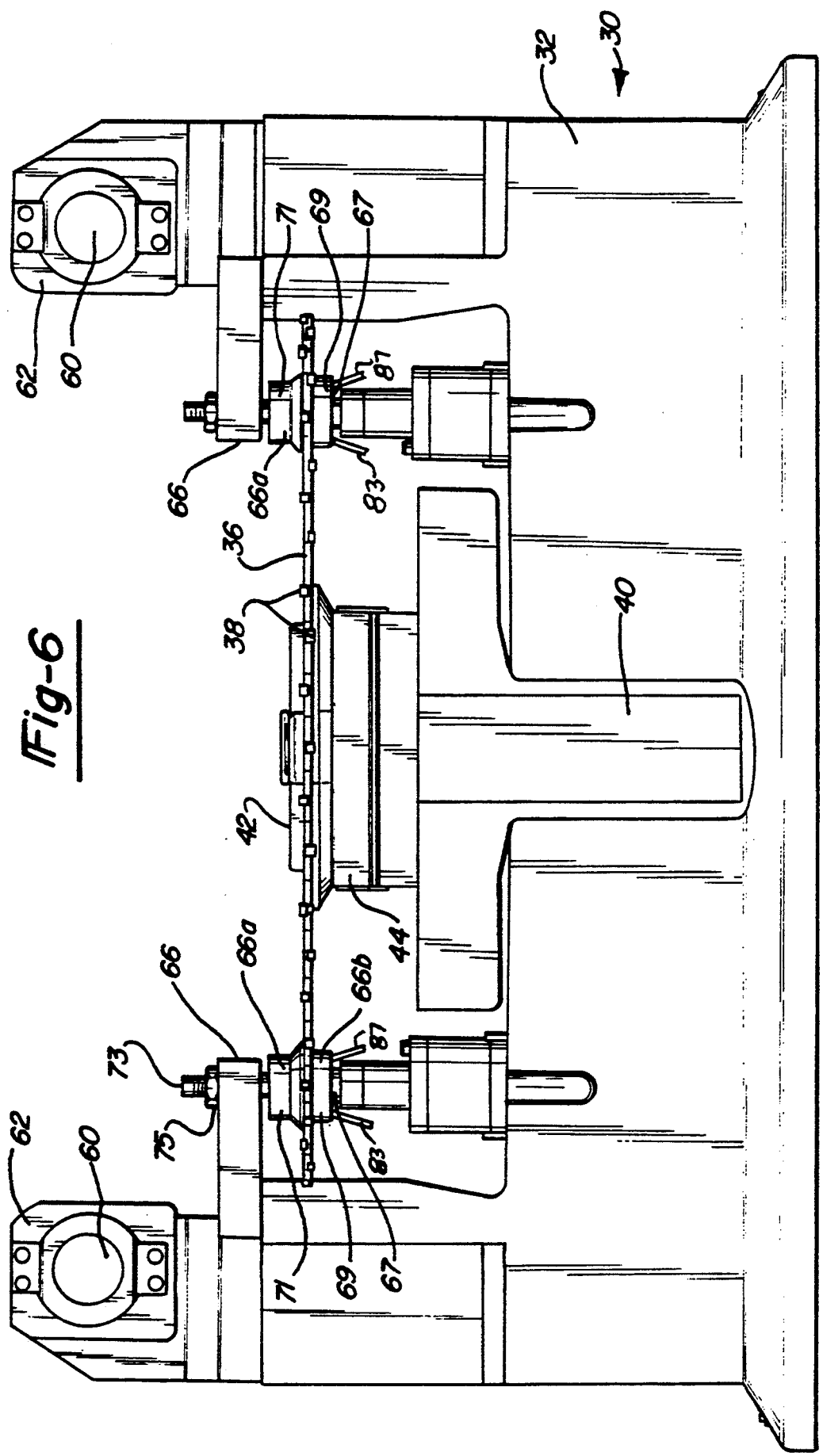
FIG. 6 is generally a front elevational view of the apparatus of FIGS. 3-5.
Figure 7:
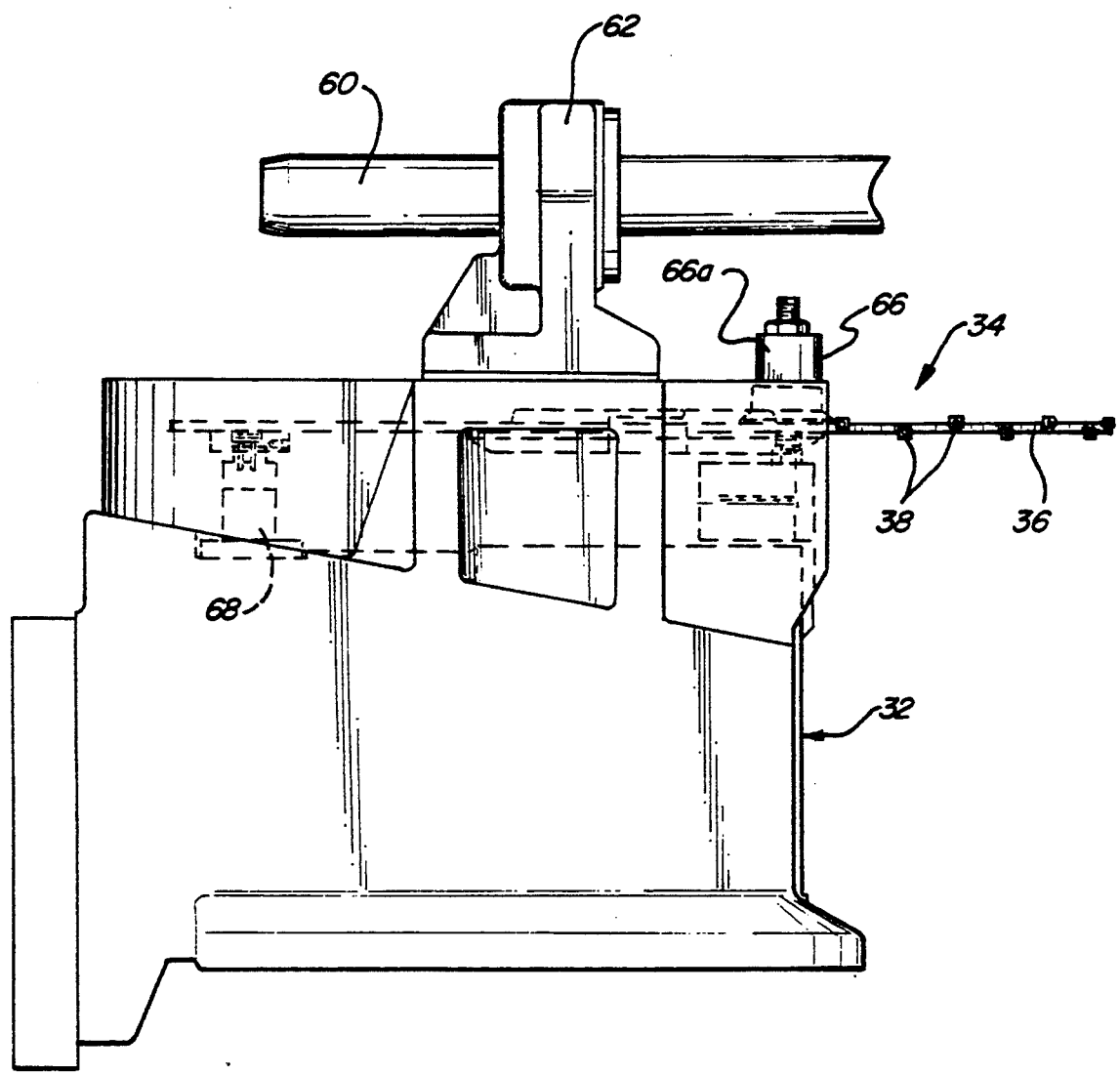
FIG. 7 is a fragmentary side elevational view of the apparatus of FIG. 3 taken generally in the direction of the arrow 7 in FIG. 3.

The saw mill cutter 34 is centrally supported for rotation upon a spindle 46 of spindle assembly 40 and is centrally bolted between raised boss 42 and a planar, spindle mounting plate 44 which is integral with spindle 46. A plurality of bolts 43 extend through openings 45 in the area of the boss 42 and are threaded into mating openings (not shown) in the spindle mounting plate 44. A pair of keys 49 are located in blind slots 51 and key the saw mill cutter 34 to the mounting plate 44 for driving engagement. The spindle member 46 is vertically supported in a bore 47 for rotation between a plurality of bearings 48a–48e (see FIG. 5). The bottom end of the spindle 46 is connected to a pulley 50 adapted to be rotated by a belt drive 52 driven by a motor 53 (only partially shown). As can be seen in FIGS. 3–5, the casting 10 is fed widthwise relative to the saw mill cutter 34 in the direction of the arrow X1. A feed assembly 54 (see FIG. 3) has a holding fixture 56 for holding the casting 10 with the casting riser 12 on the bottom. Locating pads on the casting 10 have been preformed and are used to precisely locate the casting 10 in the holding fixture 56. Such locating structures are well known in the art and hence the details have not been shown for purposes of simplicity. The feed assembly 54 includes a clamp bar assembly 58 (FIG. 5) which are adapted to grip the casting riser 12 in order to hold it during the mill cut operation to thereby inhibit tearing near the end of the mill cut. This also prevents damage to the saw mill cutter 34 and eliminates a possible safety hazard if the casting riser 12 should be torn loose. Note that the saw mill operation is made with the casting riser 12 located at the bottom. Thus after the saw mill operation the clamp bar assembly 58 can be actuated to release the severed casting riser 12 and drop it into an appropriate waste receptacle.

The feed assembly 54 includes a pair of guide bars 60 which are slidably supported in a pair of guide bushing assemblies 62. The holding fixture 56 is supported at opposite ends by a slide structure 64 which is adapted to move the holding fixture 56 in the direction of feed X1 for the mill cut operation and in an opposite return direction after the mill cut operation.

To assist in stabilizing the large diameter saw mill body 36 a pair of front support assemblies 66 are located on generally opposite diametrical sides of the body 36. The support assemblies 66 include upper and lower supports 66a and 66b. The lower support 66b has a spring loaded piston 67 which is adapted to urge a support pad 69 to initially resiliently bear against the lower face of the saw mill body 36. Next the piston 67 with the support pad 69 of the lower support 66b is hydraulically locked in place. Now the associated upper support 66a is manually adjusted to move an upper restraining pad 71 to the upper surface of saw mill body 36 with a slight preselected clearance with that upper surface and hence permits a restricted degree of deflection, i.e. for a saw mill body 36 of around thirty inches in diameter D the total permitted deflection is around 0.002 inches and hence the clearance is set at around 0.002 inches. The upper support 66a can have the pad 71 secured to a threaded rod 73 and after setting to the desired clearance can be locked in place via a lock nut 75.

Note that the support assemblies 66 are located near the front or feed end of the saw mill body 36 and are spaced apart a distance H (between centers) which distance is slightly greater than the overall length L of the casting 10. In one form the center distance H was approximately 25% greater than the length L and the clearance distance H1 between support pads 69 was less than around 10% greater than the length L. The center distance H was generally around two thirds of the diameter D of the saw mill body 36. At the same time the centers of support assemblies 66 were located near the outer circumference of the saw mill body 36 a distance H2. For a saw mill body 36 having a diameter D of thirty inches the distance H2 was around two and one half inches. In this way the support for the blade 36 is provided at the most effective location. A rear support assembly 68, with support pad 77, is provided on the non-feed side of the blade 36 at a location generally directly radially in line with the center of the casting 10. The rear support assembly 68 provides only support to the bottom surface of saw mill body 36 and in this way provides support while minimizing the resultant frictional engagement. The support assembly 68 is of the same construction as the two lower supports 66b and hence provides therewith a three point support system. In this regard it should be noted that in some applications only lower support assemblies 66b and 68 may be necessary. It should also be noted that the spacing of the supports need not be symmetrical. The lower supports 66b, without support pads 69, and rear support assembly 68, without support pad 77, can be of a construction manufactured and sold by the Hytec division of Owatonna Tool Company, such as Model Number 100226 shown in Hytec's catalog dated 1991.

The lower supports 66b and 68 are also adapted to provide an air cushion to support the saw mill body 36 and provide hydraulic lubrication relative to the lower surface of the saw mill body 36. Thus the support pads 69 and 77 are connected to a source of air pressure (not shown) via lines 83 and 85, respectively, and to a source of hydraulic lubricant (not shown) via lines 87 and 89, respectively.

In order to accurately hold and locate the saw mill cutter 34 the central mounting boss 42 on the bottom side 79 of the cutter body 36 is accurately machined to provide a planar surface. The mounting boss 42 is then accurately mated in a planar relationship on the lower mounting plate 44 to properly orient the saw mill cutter 34 to the desired plane for removal of the casting riser 12, i.e. the plane of the cut and milled surface 22. In addition an annular ring 81 is machined in the surface of the bottom side 79 to form an accurate planar surface for engagement by the lower supports 66b and 68. The ring 81 and mounting boss 42 are accurately machined not only to provide planar surfaces but also to provide surfaces which are in accurate parallelism. In some forms, the ring 81 and mounting boss 42 could be formed to be essentially co-planar. In this way the saw mill cutter 34 will be accurately held in a desired plane to form an accurate planar cut and milled surface 22 on the casting 10. In one form of the invention the ring 81 and mounting boss 42 where formed to be planar to around 0.0001 inch to around 0.001 inch and also the co-planar or planar parallelism therebetween was maintained between around 0.0001 inch to around 0.001 inch. In both instances the preferable range is around 0.0001 inch to around 0.0005 inch. In one embodiment a similar mounting boss 42 and annular ring 81 was formed in the surface on the opposite, upper side of the saw mill body 36.

Note that the direction of feed X1 is widthwise of the casting 10 and hence the feed time can be minimized whereby machining time can be minimized. In addition performing the saw mill operation in this direction promotes the formation of a more accurate and uniform finished surface 22. As noted a relatively large saw mill body 36 is desirable; for example a saw mill body 36 of a diameter of thirty inches could be used for a casting 10 having a surface to be cut and/or milled with a length L of around eighteen inches and a width M of around seven inches with the surface to be cut on the casting riser 12 having length and width dimensions generally the same or around 10% to around 15% less. Thus the diameter D of the saw mill body 36 would be around one and two thirds or around 167% of the length L.

Figure 8:
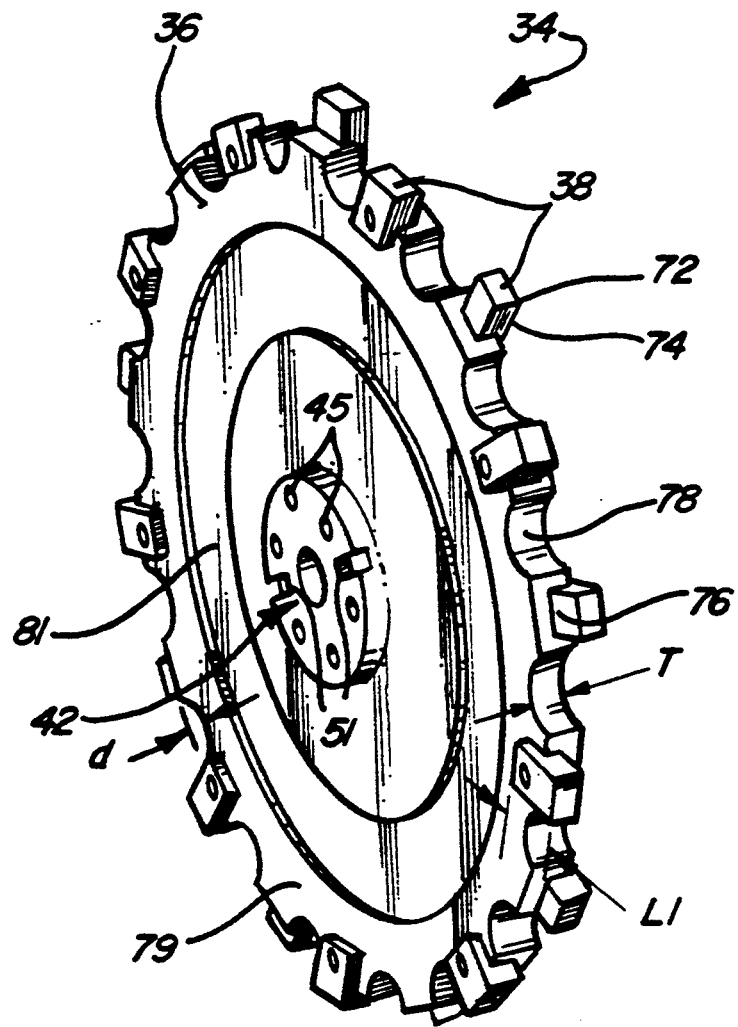
FIG. 8 is a pictorial view of the saw mill cutter of the present invention.

The saw mill cutter 34 cuts in three directions, i.e. radial sawing or cutting in the direction of feed X1 and milling in each axial or transverse direction relative to the direction of feed X1. This can be seen by reference to FIGS. 4, 5 and 8 which shows the details of the saw mill cutter 34. Note that the depiction of saw mill cutter 34 in FIG. 8 is illustrative only and, for purposes of clarity, only a few cutter inserts 38 of exaggerated size are shown.

The saw mill body 36 has removable milling cutter inserts 38 located about its periphery on both the upper and lower faces of the body 36. Each of the inserts 38 has two cutting edges 72 and 74 located at the leading edges of the insert 38. The radial cutting edge 72 performs the rough cutting or sawing operation on the casting riser 16 while the cutting edge 74 performs the milling operation on the plane of the rough cut surface. The saw mill body 36 has a plurality of circumferentially disposed slots 76 which are adapted to receive and properly locate the inserts 38. The slots 76 are of an axial depth which is less than the thickness T of the saw mill body 36 and hence the inserts 38 are securely held therein from vibration. A plurality of chip clearance grooves 78 are located in front of the leading cutting edges 72 and 74 and are adapted to receive cutting chips. These grooves are quite shallow being of a radial depth "d" which is around one half of the length L1 of the inserts 38. By providing the chip clearance d to be of a minimum radial depth the rigidity of that portion of the saw mill body 36 supporting the inserts 38 is maintained and hence deflection, vibration and/or chatter of the inserts 38 is inhibited. The inserts 38 are located alternately, circumferentially on opposite faces of the mill body 36 and hence adjacent inserts 38 on opposite faces of the mill body 36 are circumferentially spaced from each other.

Note that the inserts 38 on both upper and lower surfaces of the saw mill body 36 are of the same construction. However, milling of the rough cut surface on the casting riser 12 is not necessary and hence the inserts on the bottom side 79 can be different and provided only with the saw-cutting edge 72; alternatively, a single cutting insert of sufficient width could be used having only a saw-cutting edge such as 72 and a mill-cutting edge 74. Of course inserts for only cutting and inserts for only milling could be used.

In a preferred form of the saw mill cutter 34, the saw mill body 36 was of a diameter D of around thirty inches and was of a thickness T of around 0.4 inch; thirty two cutting inserts 38 were located on each face of the saw mill body 36 thus providing the saw mill cutter 34 with a total of sixty four cutting inserts. The cutting inserts 38 were of a type manufactured and sold by Sandvik and designated as model number 331.3 6512-31. Thus a saw mill body with a diameter D of around thirty inches or more and a thickness T of around 0.4 inch or more is desirable.

Note that by providing for a saw mill cutter 34 of large diameter and cutting and milling the casting widthwise a greater number of cutting inserts 38 can be utilized thereby reducing the wear rate and hence reducing the frequency of maintenance and minimizing the down time of the saw mill assembly 30. Thus it is desirable to have around sixty or more saw-cutting edges 72 and around thirty or more effective mill-cutting edges 74 to form the milled surface 22.

Note that in some cases the saw mill cutter 34 could provide an acceptable finished surface with one pass or cutting and milling step. In other cases additional milling and/or finishing steps may be applied. In any event the apparatus and method of the present invention provide a close tolerance first cut of casting risers thereby eliminating and/or significantly reducing the need for further metal removal.

It should be noted that the large diameter saw mill cutter 34 with supports such as 66b and 68 could be adapted for applications where only milling, without sawing or cutting, is desired.

While it will be apparent that the preferred embodiments of the invention disclosed are well calculated to fulfill the objects stated above, it will be appreciated that the invention is susceptible to modification, variation and change without departing from the proper scope or fair meaning of the invention.

We claim:

1. A saw mill cutter for machining castings for use as engine blocks, cylinder heads, cam carriers, transmission housings and the like and for removing casting risers from the casting to form a cast body with a finished surface at the plane of removal of the riser, said saw mill cutter simultaneously removing such riser and forming such finished surface comprising:

a cutter body having a generally circular shape, a plurality of removable cutter inserts located circumferentially about the periphery of said cutter body, at least some of said cutter inserts having a first cutting edge adapted to extend axially relative to said cutter body for cutting the casting rise from the casting to form a rough cut surface, at least some of said cutter inserts having a second cutting edge adapted to extend radially relative to said cutter body for milling the rough cut surface to provide a cast body with a finished surface at the plane of removal, said cutter body having a machined engagement surface on one side for engagement by a plurality of support members, said engagement surface being planar, said cutter body having a thickness of around 0.4 inch or more, said cutter body being around thirty inches or more in diameter and adapted to machine a casting having a surface to be cut and milled with a length of up to at least around eighteen inches and a width substantially less than said length whereby the casting can be machined lengthwise while being moved along its width relative to said cutter body.

2. The saw mill cutter of claim 2 with said engagement surface on said cutter body being planar within around 0.0001 inch to around 0.001 inch.

3. The saw mill cutter of claim 1 with said engagement surface on said cutter body being planar within around 0.0001 inch to around 0.0005 inch.

4. The saw mill cutter of claim 1 with said cutter body having a thickness of around 0.4 inch or more.

5. The saw mill cutter of claim 1 with said cutter inserts providing at least around sixty effective first cutting edges.

6. The saw mill cutter of claim 1 with said cutter inserts providing at least around sixty effective first cutting edges and at least around thirty effective second cutting edges,
   said engagement surface being planar within around 0.0001 inch to around 0.001 inch,
   said cutter body having a central support surface on said one side for supporting said cutter body, said central support surface being planar with the planes of said central support surface and said engagement surface being coplanar or in separate planes in spaced parallelism to within around 0.0001 inch to around 0.001 inch.

7. The saw mill cutter of claim 1 with said cutter inserts providing at least around sixty effective first cutting edges and at least around thirty effective second cutting edges,
   said engagement surface being planar within around 0.0001 inch to around 0.0005 inch,
   said cutter body having a central support surface on said one side for supporting said cutter body, said central support surface being planar with the planes of said central support surface and said engagement surface being coplanar or in separate planes in spaced parallelism to within around 0.0001 inch to around 0.0005 inch, 8. A saw mill cutter for machining castings for use as engine blocks, cylinder heads, cam carriers, transmission housings and the like and for removing casting risers from the casting to form a cast body with a finished surface at the plane of removal of the riser, said saw mill cutter simultaneously removing such riser and forming such finished surface comprising:
   a cutter body having a generally circular shape, a plurality of removable milling cutter inserts located circumferentially about the periphery of said cutter body,
   said milling cutter inserts each having a pair of cutting edges,
   one of said cutting edges adapted to extend axially relative to said cutter body for cutting the casting riser from the casting to form a rough cut surface,
   the other of said cutting edges adapted to extend radially relative to said cutter body for milling the rough cut surface to provide a cast body with a finished surface at the plane of removal,
   said cutter body having a machined engagement surface on said one side for engagement by a plurality of support members, said engagement surface being planar to within around 0.0001 inch to around 0.001 inch,
   said cutter body having a thickness of around 0.4 inch or more,
   said cutter inserts having at least around sixty effective first cutting edges and at least around thirty effective second cutting edges,
   said cutter body being around thirty inches or more in diameter and adapted to machine a casting having a surface to be cut and milled with a length of up to at least around eighteen inches and a width substantially less than said length whereby the casting can be machined lengthwise while being moved along its width relative to said cutter body.

9. The saw mill cutter of claim 8 with said engagement surface being planar within around 0.0001 inch to around 0.0005 inch.

10. A saw mill cutter for machining castings for use as engine blocks, cylinder heads, cam carriers, transmission housings and the like and for removing casting risers from the casting to form a cast body with a finished surface at the plane of removal of the riser, said saw mill cutter simultaneously removing such riser and forming such finished surface comprising:
    a cutter body having a generally circular shape,
    a plurality of removable cutter inserts located circumferentially about the periphery of said cutter body,
    at least some of said cutter inserts having a first cutting edge adapted to extend axially relative to said cutter body for cutting the casting riser from the casting to form a rough cut surface,
    at least some of said cutter inserts having a second cutting edge adapted to extend radially relative to said cutter body for milling the rough cut surface to provide a cast body with a finished surface at the plane of removal,
    said cutter body having a machined engagement surface on one side for engagement by a plurality of support members, said engagement surface being planar,
    said cutter body having a thickness of around 0.4 inch or more,
    said cutter inserts providing at least around sixty effective first cutting edges and providing at least around thirty effective second cutting edges,
    said cutter body having a central support surface on said one side for supporting said cutter body, said central support surface being planar with the planes of said central support surface and said engagement surface being coplanar or in separate planes in spaced parallelism to within around 0.0001 inch to around 0.0005 inch,
    said cutter body being around thirty inches or more in diameter and adapted to machine a casting having a surface to be cut and milled with a length of up to at least around eighteen inches and a width substantially less than said length whereby the casting can be machined lengthwise while being moved along its width relative to said cutter body.

* * * * *

UNITED STATES PATENT AND TRADEMARK OFFICE
CERTIFICATE OF CORRECTION

PATENT NO. : 5,393,174
DATED : February 28, 1995
INVENTOR(S) : Walter W. Wawrzyniak It is certified that error appears in the above-indentified patent and that said Letters Patent is hereby corrected as shown below:

Title page, before "Other Publications", insert --Foreign Patent Documents
DE3310107A1  9/84   Germany .............409/139 --.

Column 7, line 5, claim 2, delete "2" and substitute therefor --1--.

Signed and Sealed this

Ninth Day of May, 1995

Attest:

BRUCE LEHMAN

Attesting Officer        Commissioner of Patents and Trademarks